April 10, 1962   J. R. WEST   3,028,717
POWER MOWER
Filed July 31, 1957   8 Sheets-Sheet 1

INVENTOR
JOHN R. WEST

BY
Strauch, Nolan + Neale
ATTORNEYS

INVENTOR
JOHN R. WEST

ATTORNEYS

April 10, 1962　　　　J. R. WEST　　　　3,028,717
POWER MOWER
Filed July 31, 1957　　　　　　　　　　　　　8 Sheets-Sheet 3

INVENTOR
JOHN R. WEST

ATTORNEYS

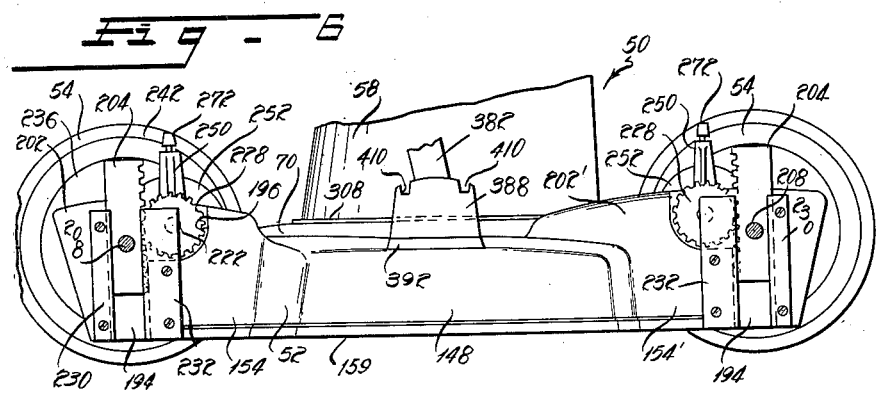

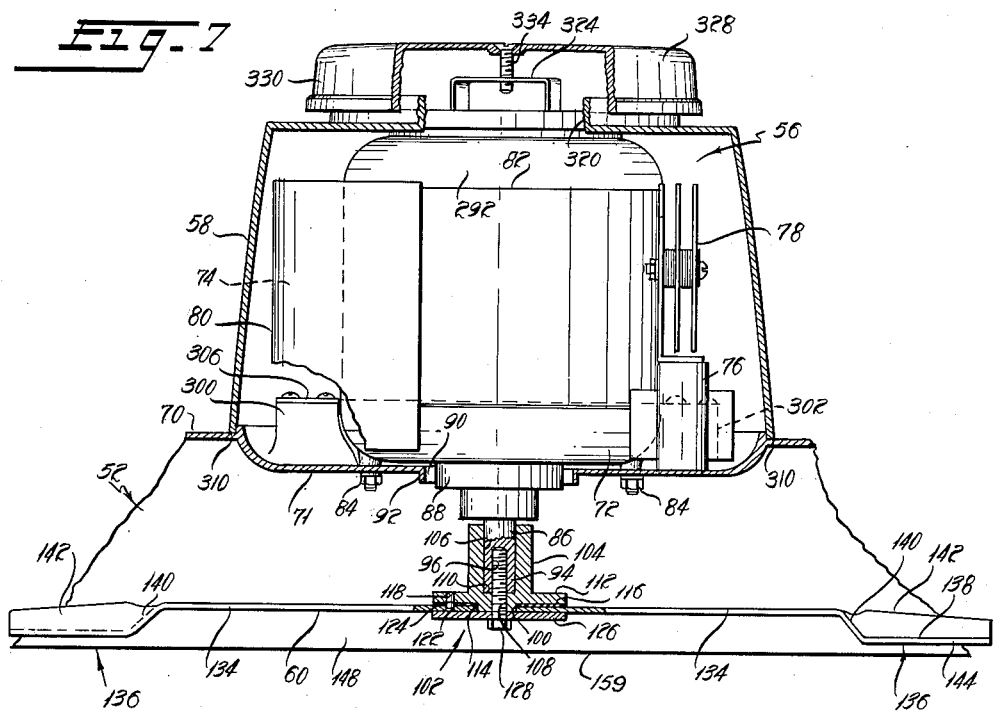

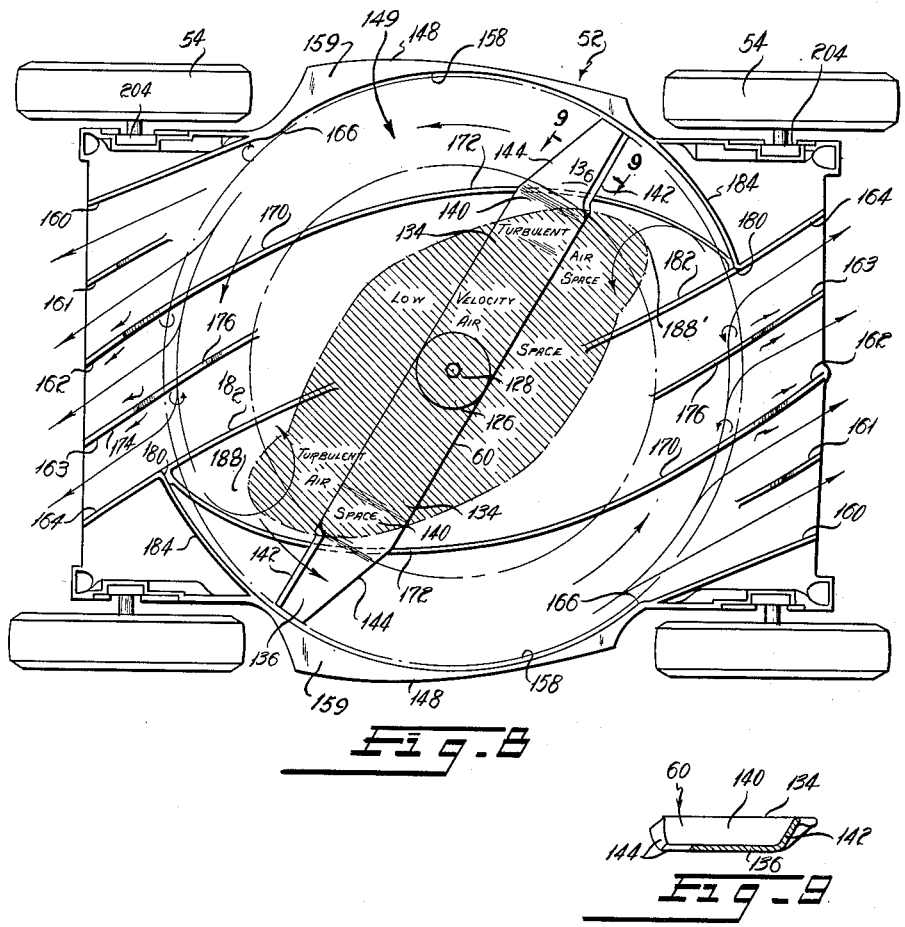

April 10, 1962 J. R. WEST 3,028,717
POWER MOWER
Filed July 31, 1957 8 Sheets-Sheet 8

INVENTOR
John R. West
BY
Strauch Nolan Neale
ATTORNEYS

United States Patent Office 3,028,717
Patented Apr. 10, 1962

3,028,717
POWER MOWER
John R. West, Marysville, Ohio, assignor to The O. M. Scott & Sons Company, Marysville, Ohio, a corporation of Ohio
Filed July 31, 1957, Ser. No. 675,331
14 Claims. (Cl. 56—25.4)

This invention relates to power mowers and more particularly relates to construction of powered lawn mowers incorporating features to insure proper handling and cutting techniques conducive to lawn grass growth and plant protection, improved mower construction, convenience and operator safety.

Although the primary purpose of a lawn mower is to cut the grass, three other major factors, (1) proper shearing of the grass blades to the height best adapted to promulgate healthy continued plant growth and automatic even distribution of the cuttings to prevent spot smothering of the plant life, (2) dependable machine functioning under existing operating conditions and (3) safety to the operator, should be considered and provided for in a mower offered to the public. With a dependable, rugged machine, which would accomplish the best possible results in lawn cutting with maximum safety to the operator, as the final goal, this invention was conceived and, as specifically disclosed hereinafter, culminated in a powered rotary lawn mower embodiment. Of course it is to be understood that various inventive concepts which exist in the overall mower combination can be readily used in mowers deriving power from sources other than the electric motor herein disclosed.

There are many inherent factors in previously known power mowers which have resulted in (1) lawn cutting techniques that damage the grass, (2) mower breakdowns or (3) hazardous operating conditions or combinations of these disadvantageous features. Unsatisfactory lawn cutting operations include: "scalping," the condition resulting when the blade digs into high spots; "bruising," the repetitive striking of grass blades not properly positioned for clean cutting by high speed cutting blades, incorrect cutting blade shape and the cooperation of blade shape with the housing; uneven discharge of clippings or clumps of chewed up and pulped grass; and uneven cutting dispersal from one side of the mower. Ideally, lawn grass should be cut frequently, no more than ½ inch being removed at a time and preferably less (i.e., ¼ to ⅛ inch). However, the form of independent wheel adjustment heretofore used does not permit adjustments of mower cutting heights (for seasonal change) of much less than ½ inch. All of these unsatisfactory operations contribute to an unhealthy and unsightly lawn with bare spots, dead grass tips, smothered grass or ragged areas.

Lawn mowers, being cutting devices, are dangerous if improperly used or if the high speed cutting members are improperly protected by safety devices. In many mowers, on the market previous to this invention, the openings into the whirling blades are such that accidental injury can easily occur and has often occurred by inadvertently placing the foot or other body member into the openings or by inadvertently rolling or backing the mower over the foot or other body member. It is a common occurrence, when using power rotary mowers, for the fast moving blade to pick up and rapidly discharge stones, sticks and other hard objects which become a source of danger to anyone in their path. Prior electric mowers generally have the cord inseparably directly connected to the mower and, as far as is known, have an on-off switch on or adjacent to the handle to control motor operation, and thus present several added sources of danger. For example, the switch may be in an "on" position when the line is plugged to an electric source, in which case the blade will rotate unattended and is a source of danger to young children, pets and even older persons who may be unaware that the mower is connected to a source of power. Further, when the prior electric mowers are turned over for cleaning, the switch on the handle may inadvertently be knocked to "on" position possibly resulting in loss of hands or fingers. Many times a mower can "get away" from the operator if he slips or is thrown off balance, and this can occur very easily when cutting on a slope or a bank, resulting in an unattended mower with high speed rotating blades, rolling over the operator, or the mower tilting over and the operator falling into the upended rotating blade.

Because of the relatively recent widespread acceptance of rotary mowers, many versions have appeared on the market, some of which are not rugged enough to withstand continued use in the vicinity of moisture, dust, dirt and other detrimental factors. Many manufacturers of previously known rotary mowers have given no consideration to correlating their mower constructions to proper cutting techniques and the necessary rudiments of good lawn maintenance or to devising a rotary mower with cooperating blade and housing structure which will provide proper grass blade cutting action and clipping distribution. The resulting areas cut by such previously known mowers are far from being uniform.

The primary object of the invention is to overcome all of the foregoing disadvantages in powered mowers and to adequately satisfy the criteria of proper cutting technique, dependability and safety, which should be present in a power mower. This end has been accomplished through long and expensive research, testing, changes and development of new ideas correlated to horticultural knowledge of healthful grass plant growth and maintenance requirements.

Another object of the present invention, in a preferred embodiment is to provide a rotary mower with a frame having integral fore and aft vaned discharge ports the vanes of which are set close enough and at a sufficient angle to guard against inadvertently pushing the mower over stationary objects that are high enough to hit the blade, thus warning the operator as the object hits the vanes, and making it impossible for the operator's foot to be inserted through the inclined vanes and, should the foot pass under the vanes, there is a positive tendency of the vanes to hold the foot below the blade level.

A further object of this invention is to provide a frame with fore and aft vaned discharge paths, the vanes of which have an inclination which prevents the tangential discharge of broken blades or stones at high speeds or velocity which could cause serious damage to persons and property, a length, contour and disposition related to a frame supported low speed rotary blade provided with special tip formation assuring a scientifically predetermined grass cutting action and airflow paths under the housing, effecting even dispersal and distribution of clippings which prevents matting and static buildups of clippings within the housing and in the discharge. As a result of numerous tests, the ideal correlation of blade tip shape, speed and cooperative housing formations has been devised to provide a low speed grass cutting blade action with sufficient blade created suction to positively hold the grass upright and properly present the individual grass blades to the cutting edges during the cutting action while creating a discharge airflow out of the housing in suitably spaced paths of sufficient volume to assure a widespread essentially even discharge of clippings.

A further detailed but important object of this invention resides in providing a novel, rugged, dependable power mower construction which incorporates healthy grass cutting action in accord with good dawn maintenance techniques and novel operator safety features.

Another object resides in providing a novel rotary blade mower, having a low speed drive with a relatively high tip suction to hold the grass into the cutting path, in which the mower frame has structure that cooperates with the blade to enable proper cutting dispersal and distribution of the material being cut.

It is further contemplated as an object of this invention to provide a novel housing structure so disposed relative to the blade to prevent high velocity tangential discharge of any heavy particles such as rocks or broken blades while effectively preventing introduction of objects of predetermined size under or straight into the housing discharge openings.

Still another object resides in providing in a rotary mower, a novel frame and blade structure in which the cutting portions of the blades are in minor fraction of the diametral blade dimension and are disposed in a plane below a plane containing the major blade structure, the cutting plane is disposed above the lower level of grass outlet deflector vanes on the body, the deflector vanes extend substantially inwardly toward the blade axis into areas above the blade and are essentially inclined in offset relationship to the direction of tangential discharge from the rotating blade.

Further novel features and objects of this invention will become apparent from the following detailed description and the appended claims taken in conjunction with the accompanying drawings showing a preferred embodiment thereof, in which:

FIGURE 6 is a side elevation view of the mower shown in FIGURE 5, with the near wheels removed to permit illustration of the wheel axle mountings;

FIGURE 7 is a vertical section view on an enlarged scale taken on line 7—7 of FIGURE 4 illustrating the motor mounting, its housing and the cutting blade with blade hub and connections shown in section;

FIGURE 8 is a bottom plan view of the mover casing similar to FIGURE 5 and illustrates the rotary blade and airflow patterns;

FIGURE 9 is a section detail taken on line 9—9 of FIGURE 8 and illustrtates the cross section contour of the blade cutting tips;

Figure 10:
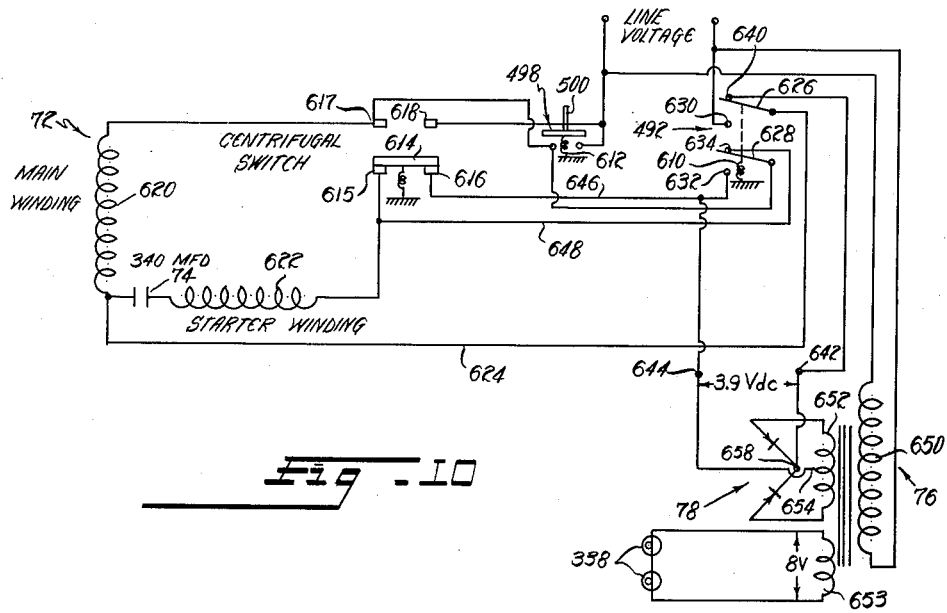
Figure 11:
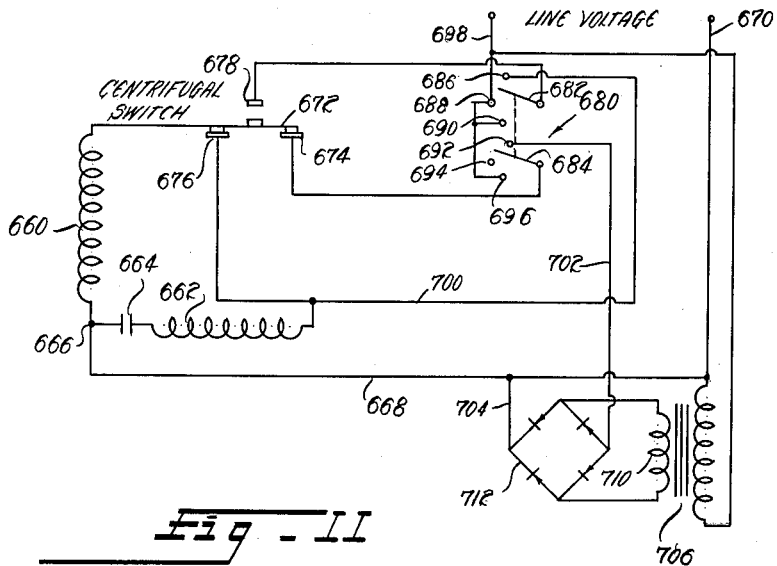
Figure 12:
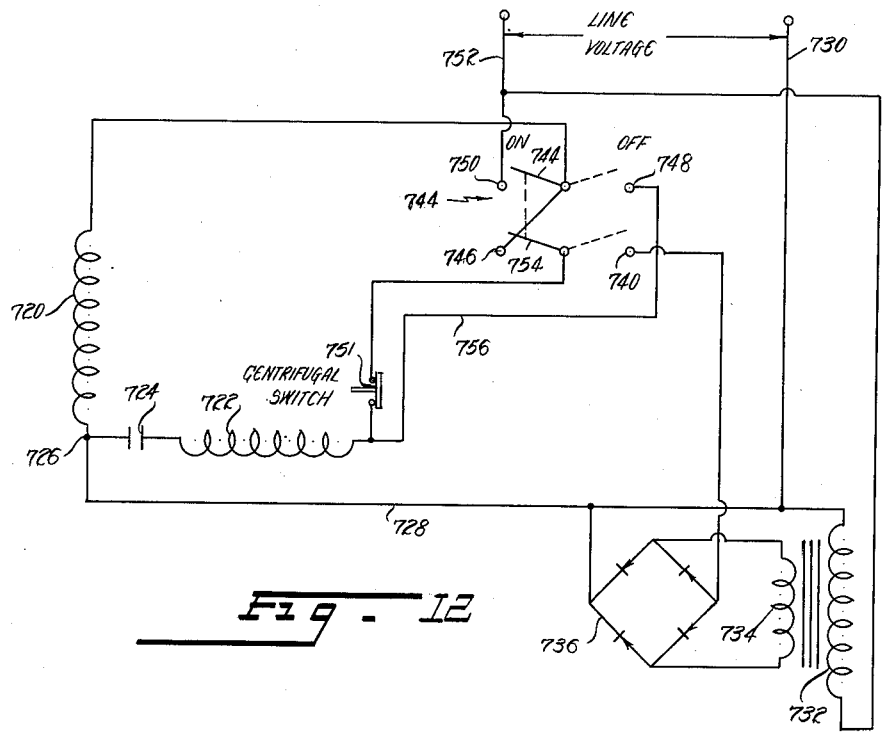
Figure 13:
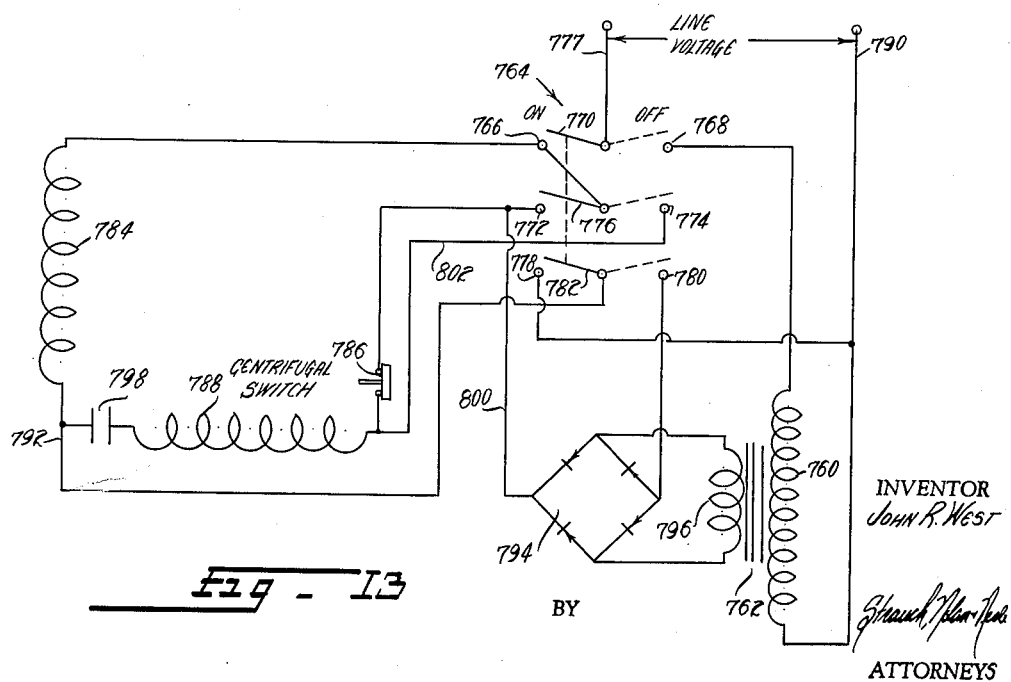

FIGURE 10 is a schematic diagram illustrating the components and circuitry used for the electric motor control and providing safety features to start and stop the motor combined with regenerative dynamic motor braking; and FIGURES 11, 12 and 13 are schematic diagrams illustrating alternate forms of circuitry and control which can be used in lieu of the circuit in FIGURE 10 and which incorporate safety features and regenerative dynamic motor braking.

GENERAL

Briefly, the disclosed embodiment (FIGURE 1) of a power mower 50 has a body frame casting 52 supported on front and rear sets of wheels 54, the wheels in each set being conjointly adjustable to regulate the height at which the mower body is disposed above a lawn surface.

A low speed electric motor 72 is mounted on top of the frame 52 within a housing with the motor shaft on a vertical axis and projecting below the frame. A specially shaped diametrical double rotary bladed cutter 60 is fastened, through a shear pin drive connection, to the motor shaft below the frame and, in operative cooperation with specially devised air flow fins or vanes 160—164, creates a strong upflow over areas of grass to be cut, creates air swirls, a low velocity swirl around the center and discharge paths from the front and rear of the frame (FIGURE 8). The rugged frame has dependent portions of the air flow fins (160—164) arranged at the front and rear discharges to effectively prevent tangential discharge of broken blades, rocks, sticks or other articles yet assures efficient discharge of cuttings without bunching and beating of the cuttings into juicy masses which tend to clog the discharge passages and be distributed over the lawn necessitating raking to avoid spot smothering of groups of grass plants. The dependent fin portions also constitute a bumper to resist a pushing force to move the mower over large rocks or obstacles encountered in mowing. Although five fins are disclosed at each end of the illustrated embodiment, it is to be understood that the exact number of fins can vary within a reasonable range and still enable desirable function.

Operator safety is provided by frame design and the special motor 72 with its safety control circuit and components. In this control circuit, two switches are used and are required to be simultaneously actuated to start the motor. One is a running switch remaining under the operator's control by handle levers during operation and serves as a "deadman" switch. If for any reason the operator relinquishes control of the running switch, an automatic regenerative-dynamic braking circuit stops the motor within approximately three seconds. In using this mower it is conceived that an electric line storage reel be fastened in the ground adjacent an area to be mowed. Additional reels can be used to extend the mowing area. The electric line from the reel is attached to a strain relief plug extension on the mower handle to permit line to be drawn out as needed when the area is mowed and to effectively cast the line aside upon reversal of the direction of movement of the mower during the mowing operation as hereinafter pointed out. The line can be guided around obstacles such as corners of buildings, flower beds and shrubs by looped pegs placed in the ground, which will primarily serve to prevent the line being whipped across valuable plants.

SPECIFIC DESCRIPTION

Figure 1:
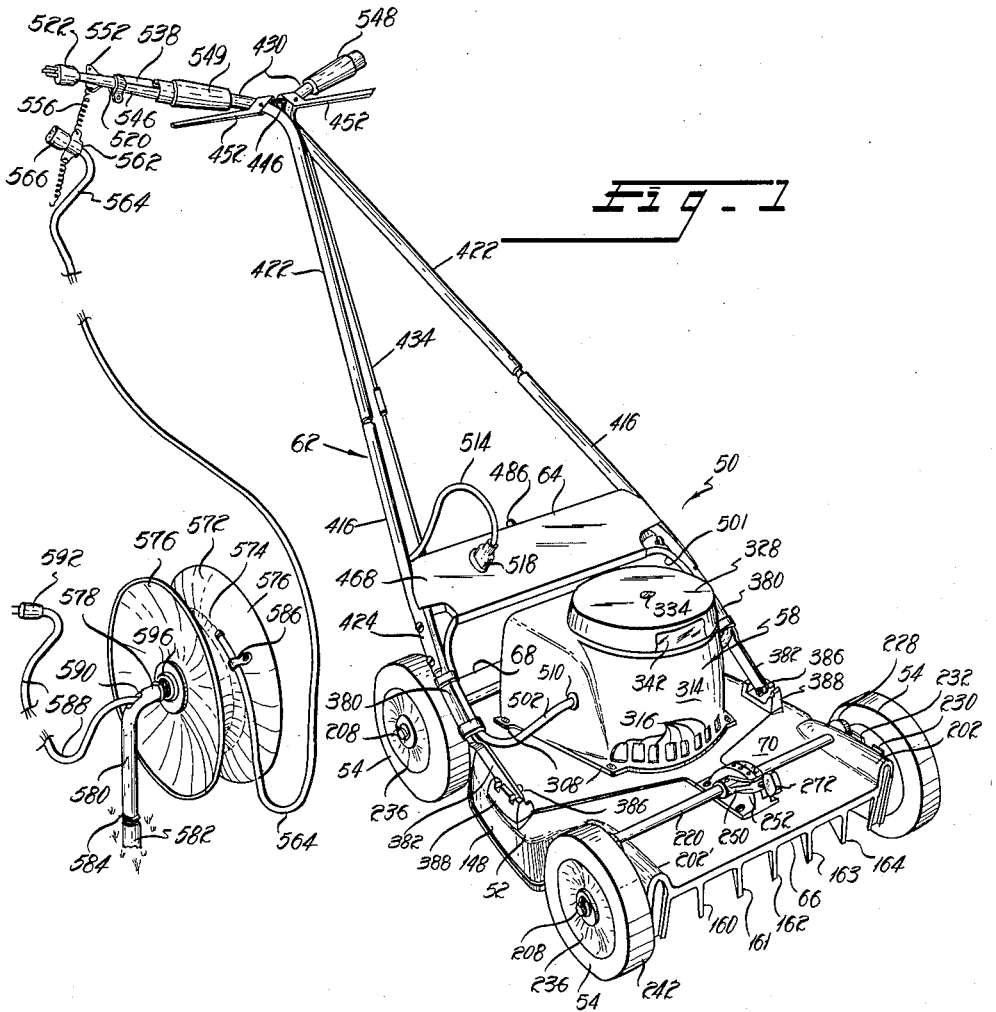
FIGURE 1 is a perspective view of a power mower embodying the principles and objects of this invention.

With reference to the drawings for specific details of the exemplary embodiment, FIGURE 1 illustrates an electric powered rotary blade mower 50 which incorporates the various novel concepts of this invention. The same reference characters are used to designate identical parts throughout the drawings and in the specification.

Figure 2:
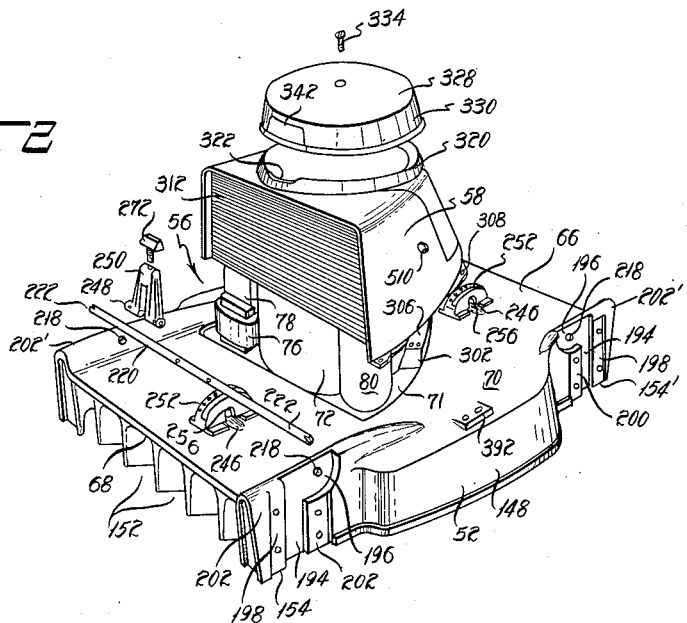
FIGURE 2 is an exploded (rear) perspective view of the mower with the handles, wheels and wheel mountings omitted.

Mower 50 includes a housing frame 52 with four wheels 54, an electric motor power assembly 56 enclosed by the motor housing 58 and carrying the rotary cutter 60, and a handle assembly 62 which carries a compact enclosed electric component panel assembly 64. Power for motor assembly 56 is supplied through electric components and circuitry which are enclosed in handle assembly 62, the electrical panel 64 and the motor housing 58 and will be fully described hereinafter. Handle assembly 62 is pivotally secured to the housing 52, as will be described, in a manner enabling handle assembly reversal so the mower 50 can be pushed in opposite directions and thus, there is no true front and rear ends of the mower. However, the housing 52 and motor housing 58 are designed to provide distinctive opposite end appearances and for clarity in this description the end 66 shown in FIGURE 1 will be considered the front and the end 68 shown in FIGURE 2 will be considered the rear.

Mower housing 52 is preferably made of cast metal, i.e. steel, aluminum, an alloy or the like and its upper or top wall 70 provides a rigid horizontal platform with a depressed area 71 to carry the motor assembly 56 which in turn carries the rotary cutter 60. Even though the top wall of housing 52 includes depressions and raised portions it has a substantially planar shape. Accordingly, the phrase planar top wall as used hereinafter refers to the general planar aspect of the top wall even though it may include depressions and raised portions. Motor assembly 56, see the FIGURE 10 wiring diagram includes a capacitor type inductance motor 72, a capacitor 74, a transformer 76 and a dry plate rectifier 78. The capacitor 74 and its cover 80 are fastened to the motor center frame 82 and the motor 72 is centrally located and secured by studs and nuts 84 in the depression 71 on the mower housing horizontal top wall 70 with the axis of motor shaft 86 vertically disposed. A bearing boss 88 on the lower end bell of motor 72 projects into an opening 90 through the mower housing wall 70 which includes a narrow depending annular flange 92. There is but a slight clearance between boss 88 and the flange 92. The opening flange 92 serves as a barrier against debris passing from below the mower housing to the interior of the motor housing. The depressed sink 71 funnels any moisture, which may advertently enter the motor housing 58, to opening 90 thence to ground. Sink 71 also aids in heat dissipation from the motor housing 58 by providing an increased area over which air flow above the cutter 60 can pass. The lower end 94 of motor shaft 86 has a threaded blind bore 96 and projects from the motor through the mower housing opening 90 to a position below the mower housing horizontal wall 70.

Rotary cutter 60 (FIGURES 7, 8 and 9) is an elongate member, made of flat steel material, with a central aperture 100. The cutter hub assembly 102 secures the cutter 60 to a motor shaft end 94 and includes a safety shear pin arrangement. Hub assembly 102 includes a collet 104 with a bore 106 and counterbore 108 which provides a shoulder 110 at the base of bore 106. The lower end of collet 104 has an integral radially disposed annular flange 112 and a coaxial depending piloting flange 114 around the counterbore 108. A fibre washer 116 is disposed over the piloting flange 114 against the radial flange 112 and the cutter 60 is disposed, with its aperture 100 around the piloting flange 114, against the fibre washer 116. A small hole 118 in the collet radial flange 112, a similar hole in the fibre washer 116 and another countersunk hole 122 in cutter 60 are aligned in assembly and a bevel headed shear pin 124 inserted through cutter 60, fibre washer 116 and collet flange 112 with the beveled head disposed in the countersunk portion of the hole 122 in the cutter bar. The depth of piloting flange 114 is very slightly less than the combined thicknesses of the fibre washer 116 and cutter 60, and the shear pin 124, cutter 60, fibre washer 116 and collet 104 are clamped together and secured, with collet bore 106 and inner shoulder 110 over the motor shaft end 94, by a steel washer 126 and screw 128 which is threaded into shaft end bore 96. Washer 126 is clamped against the end of piloting flange 114 and presses the cutter 60 and fibre washer 116 together to provide a snug fit with a slight friction which with shear pin 124 transmits sufficient torque to ensure a drive connection between the collet 104 and the cutter 60 for normal cutting operations. However, if the cutter 60 hits an iron stake, a rock or some other similar object, the drive torque between the collet 104 and cutter 60 is transmitted through the shear pin 124 which will fail and effectively result in decreased detrimental effects on the motor such as bending of the shaft 86.

Cutter 60 has two horizontally extending arms 134 each of which terminates in a short bladed end 136 tapered as seen in plan (FIGURE 8) to a reduced tip width. Each bladed end 136 includes a horizontal leading portion 138 offset approximately ½ inch below the plane of the major portion of arms 134 by an abrupt bend 140. The trailing portion 142 of each bladed end 136 is curved upwardly and has a slight taper to a narrower upsweep at the tip. The leading edge 144 of horizontal portion 138 and bend 140 is heat treated and beveled to form a swept back knife edge. This sweepback of knife edge 144 enables a shearing cut on grasses as the cutter 60 is rotated. By abruptly bending the bladed ends 136 and also bending their trailing portion into an upswept trailing edge an extremely strong compound transition is formed between the major portion of arms 134 and the bladed ends 136 to provide rigidly disposed bladed ends despite the abrupt bend 140.

The trailing edge portions 142 are upswept approximately 60 degrees to form the end portions 136 of cutter 60 as highly effective compound axial and centrifugal flow fan blades, which upon rotation of cutter 60 provide a strong axial flow suction above the grass under the mower housing 52. The relatively high angle of the upswept trailing edge is required to obtain the proper suction under low (1750 r.p.m.) speed rotation to lift the grass upright and enable a clean, even cut, and to also vacuum the lawn, pulling dead debris into the blade ends 136 for subsequent removal.

Inasmuch as the major portions of arms 134 are disposed in a horizonal plane above the abrupt dependent offset of the bladed ends 136, the only portions of the cutter 60 that contact the growing grass are the short bladed portions 136. This important construction eliminates to a large extent the repeated beating and bruising of the tips of growing grass by major portions of the cutter 60 subsequent to actual cutting of the grass.

Figure 3:
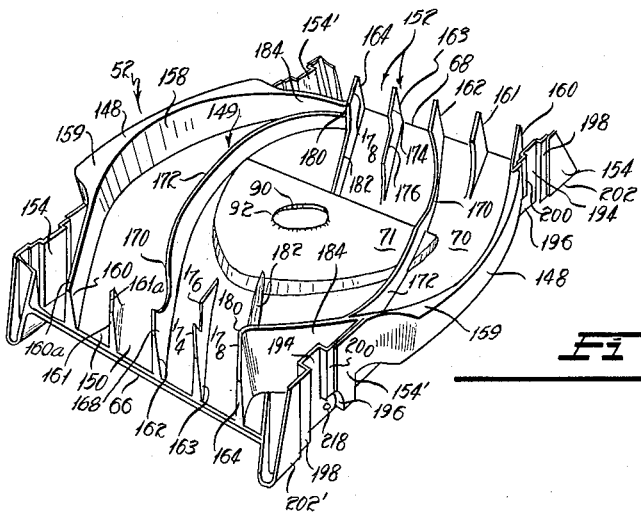
FIGURE 3 is a perspective bottom view of the mower frame housing with all other components omitted, illustrating the relative angles, sizes and shapes of the airflow control and object deflector vanes.
Figure 4:
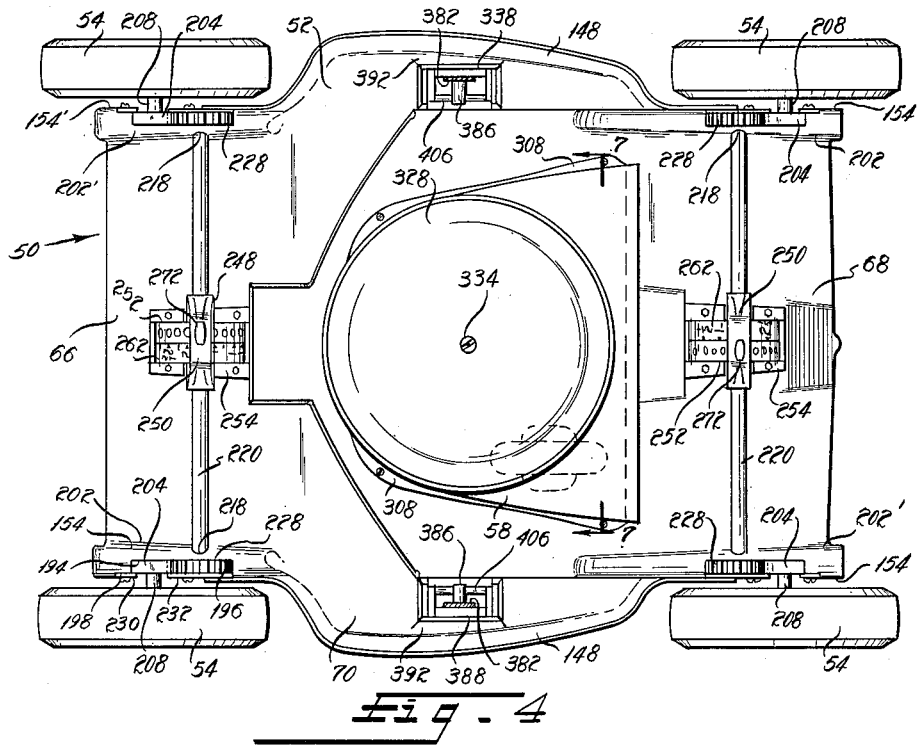
FIGURE 4 is a top plan view of the assembled mower with the handle broken away.

As clearly illustrated in FIGURES 3 and 8 the underside of mower housing 52 has depending side wall on skirts 148 and intermediate fins, which constitute air control vanes forming internal air flow paths with similar front and rear discharges 150 and 152. The side walls 148 and the fins (or vanes) project in a substantially normal direction from the planar shape of the top wall 70. The underside is essentially symmetrical fore and aft of the cutter axis, the only non-symmetrical aspects deriving from casting depressions due to selected exterior design configuration, and from the depressed motor support sink 71. For convenience in definition, the space 149 (FIGURES 3 and 8) between skirts 148 and the end discharges 150 and 152 will be designated the blade chamber.

Wheel assembly support structures 154, to be more fully described hereinafter, are integral with and depend from each of the four corners of the upper wall 70 of mower housing 52 and their lower edges are disposed in a common horizontal plane (FIGURES 6 and 7) approximately 3/16 inch below the plane of rotation of the blade edges 144 on the horizontal cutter blade end portions 136.

Also being integral with and depending from upper housing wall 70, the two side skirts 148 are faired into and made integral with the wheel assembly support structures 154 and 154' to therewith provide dependent sides of housing 52, the entire lower edges 159 (FIGS. 3, 5, 6 and 7) of which are disposed in the aforementioned common horizontal plane (see FIGURE 6). The inner surface 158 of each skirt 148 (FIGURES 3, 5 and 8) is curved about the motor shaft axis to provide an approximate ¼ inch clearance from the circular tip path of cutter 60, and the skirt converges slightly to a smoothly faired curvature into upper housing wall 70. The curved shape of skirts 148 provides a lateral housing extension between the wheel assembly supports 154 and also provides recesses at each corner of mower housing 52 for the wheels 54. Skirts 148 bulge laterally beyond wheels 54 an amount which enables the cutter tip path and therefore the cutting path to reach at least to the outer edge of the wheel tire tracks.

Figure 5:
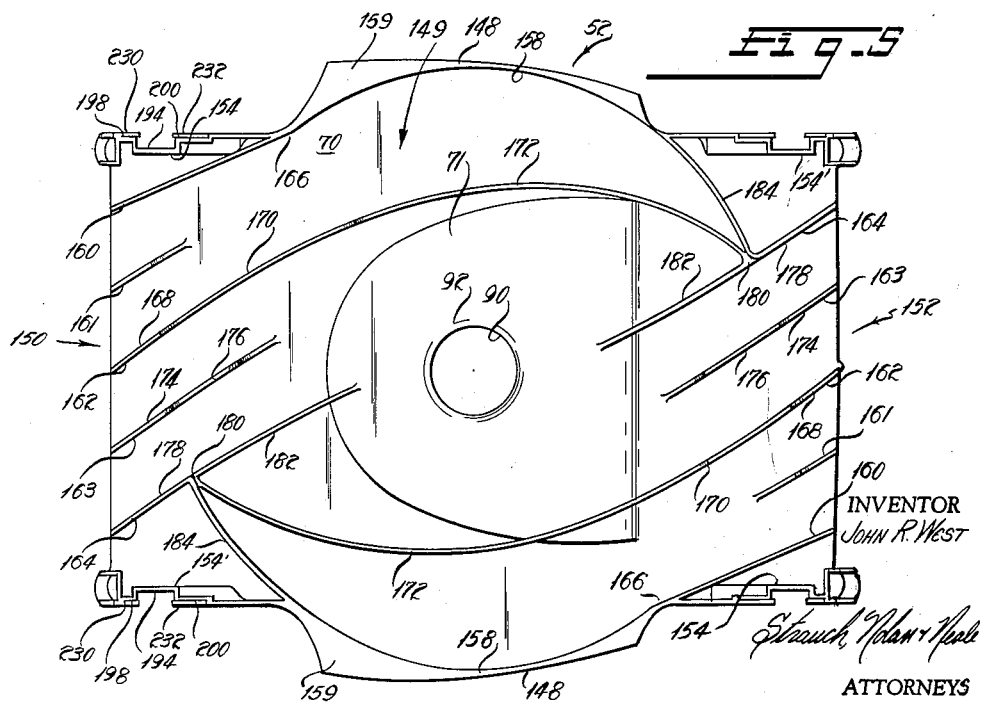
FIGURE 5 is a bottom plan view of the mower housing with all other components omitted, to further illustrate the relative angles, cutouts and termination positions of the airflow control vanes.

The major portion of each end of the mower housing 52 is utilized for discharge of cut grass in order to permit a maximum discharge opening. As the depending fin formations of each of discharges 150 and 152 are similar, a description of one will suffice. In FIGURES 3 and 5, a series of heavy, thin tapered, vertical fins 160, 161, 162, 163 and 164 (five in the illustrated embodiment) are integral with and depend from the upper housing wall 70, terminating at each discharge end and inclined relative to a longitudinal plane for a purpose to be later described. The lower edges 160a, 161a, 168, 174 and 178 of all fins 160—164, adjacent the mower discharges 150 and 152, are disposed in approximately the common plane of the lower edges 159 of the side walls, thus the discharge portion of all the fins (which is the portion of greatest depth of each fin or vane) projects downwardly to a position below the level of cut. The spacing between adjacent fins 160—164 is sufficiently close to prevent entry of a person's foot into the cutting path of blades 138 and if a person's foot does slip below the lower plane of mower housing 52 the rigid fins 160—164 will hold the shoe down so the operator's toes are below the cutting plane. The angles of fins 160—164 relative to a longitudinal plane also assist in holding the shoe down because, generally speaking, the lower edges of at least two of fins 160—164 will contact the person's shoe tending to keep the foot in a down position.

Each of fins 160—164 have a different shape and different portions of the individual fins provide functions of a bumper, baffling deflection of objects picked up and thrown by the blades and air flow control to handle the discharge of cut grass in a proper manner. Fin 160 has a constant depth and extends to and become integral with the mower housing side wall at a position approximate the merger curve 166 where skirt 156 and wheel assembly support 154 join. The inclination of fin 160 is approximately tangent to the inner skirt surface 158 just ahead of the merger curve 166. The merger curve 166 is disposed to extend a very slight amount into the path between fin 160 and fin 161 for purposes to be described.

The second fin 161 is relatively short in length and is inclined a slightly greater amount than is fin 160, and has several functions. It prevents straight through entry of a fixed object on the ground, such as a pipe in the ground, a curbing or a large rock, into the cutting plane. It holds a person's feet, inadvertently coming under the mower, below the cutting plane, serves as a baffle deflector for objects picked up and thrown by the blade, and also serves to divide the discharge air created by the blade sweeping past the housing skirt (FIGURE 8).

Fin 162 is the longest one of the group, extending on an incline essentially parallel to fin 161 and then gradually curving inwardly to abut and integrally join the opposite discharge fin 164 inward of the discharge end of fin 164. A short extent 168 (see FIGURE 6) of the lower edge of fin 162 at its discharge end is disposed at the lower level of housing 52 and the remainder is of a depth enabling clearance for the path of the cutter 60 below the fin. That portion 170 of fin 162, immediately behind the discharge extent 168, which is above the path of blade end portions 136, is reduced in depth almost to the upper housing wall 70 while the remaining gradually curved large portion 172 of fin 162 has a depth which disposes its lower edge slightly above the rotating path of cutter arms 134.

The fourth fin 163 is inclined essentially parallel to fins 161 and 162 and has a forward lower edge 174 terminating short of the cutter tip path, and its succeeding portion 176 is stepped to a depth just shy of the path and approximately the length of the upper edge of the trailing portion of blade ends 136. Fin 163 then tapers abruptly to merge into the upper housing wall.

The fifth fin 164 is inclined essentially parallel to fins 161—163 and has a lower edge 178 terminating at a position 180 short of the cutter tip path, and its succeeding portion 182 is stepped to a depth approximately equal to portion 176 of fin 163. Portion 182 of fin 164 tapers gradually into the upper housing wall 70 ahead of the motor mounting sink 71.

A short curved wall 184 is integral with and depends from the upper housing wall 70 between fin 164 and the housing side wall and has a depth equal to that of skirts 148. One end of curved wall 184 is integrally joined to and essentially serves as a continuation of skirt wall curved surface 153, and the other end becomes integral with fin 164 and the tail end of the opposite fin 162 at position 180 on fin 164.

In addition to serving as air distribution and flow guide vanes, fins 160—164 are positioned to act as a baffle and restrict the speed of discharge of hard objects by the cutter 60. Whenever a rotating member strikes an object, it will force the object of travel essentially at right angles from a radius to the point of contact. Viewing FIGURE 8, it will be seen that, in practically all positions of the cutter blades 136, a perpendicular path from the blades will intersect a fin or a housing skirt 148. An object thrown in such paths must ricochet back and forth between fins in order to find an outlet. Even the protruding merger curve 166 helps deflect thrown objects from passing straight out between fins 160 and 161. Ricocheting of small objects greatly reduces their discharge force and larger objects cannot pass through the fins 160—164.

As has been previously described, the major portions of the cutter arms 134 are disposed above the level of the blade ends 136. When an object is picked up during forward mower travel it is generally ricocheted between the forward fins and will have a tendency to fall down under the center of the mower. As this position is under the raised portions of cutter arms 134, the object is no longer hit by the cutter. Also the center portions of cutter 60 are traveling at much less speed than the blade ends 136 and cannot exert a large force on an object. The decreased depth at 170 on fin 162, the open area behind portion 176 of fin 163 and the shallow portion 182 of fin 164 provide a lateral pathway across the fins above the blade ends 136. This construction permits the blade to scoop or hit a hard object across the mower sideways rather than discharging it out of the front. Such objects will hit the large portion 172 of fin 162 and are caused to deflect back to the center of the mower where they will drop to the ground and the mower can pass over them.

If any object such as an upright pipe of ¾ inch or less diameter passes between fins 160—164 and the blade hits it, damage to the motor is prevented by the aforementioned shear pin provision.

Most motors, both gasoline and electric but particularly electric, do not have sufficient power to effectively cut the grass and properly discharge it from the mower. For this reason, the mower power plants are subject to continual stalling and at times, in the case of an electric motor, overheating. To overcome this difficulty most mower manufacturers have increased the revolutions per minute to between 3000 and 6000. The momentum of the blade at such high speeds normally will carry it through heavier work loads when one hits a heavier patch of grass and in such manner reduces the amount of stalling. However, a blade traveling at this high speed, hits the grass many more times than does a blade at the preferred 1725 r.p.m.'s used in the electric mower embodiment of this invention. At higher speeds of blade rotation the grass is actually beat until the sap in the grass forms a gooey mass and causes the clippings to bunch and cling to the inside surfaces of the mower building up static deposits until the weight of the clippings becomes so heavy that gravity pulls them from the mower and they drop in clumps or are thrown out of the mower onto the grass. Such clumps of clippings are normally referred to as "balled clumps," which are not picked up by sweepers and are difficult to rake up. The "balled clumps" mat to the soil and grass, smothering the covered grass and eventually result in large bare spots in the lawn unless the clumps are gathered by hand.

The preferred revolutions per minute of motor 72 with a nineteen inch cutter is 1725 which provides an approximate 92 m.p.h. tip speed. The special motor provides sufficient power to handle the cutting job necessary. The major inner portions of the blade arms 134 have been raised so they will not hit the grass. At the relatively low speed at which the blade is traveling, only approximately the first 1" of the blade is actually doing any cutting and except when the mower is tilted at an angle, to do a double mowing job, the grass is being cut only on the forward half of the rotation of the blade. To eliminate beating of the tips of the grass, after it has once been cut, the extent of the actual cutting edge of the blade at the level of the mown grass has been reduced to a minimum.

The combined low speed, short length of cutting edges and air flow created within the housing of this mower are a result of a definite effort in studying the air movement within an enclosure, such as used above the cutter of a rotary mower, to develop a principle whereby the grass will be cut much the same as it is with a reel mower. The ideal cutter tip speed must be sufficient to obtain a scythe cutting action by the blades, yet it must be kept low. However, if the speed is too low the fan efficiency will suffer. Thus, experiments have shown that an r.p.m. of approximately 1700 on a 19 inch blade will provide sufficient suction to raise the grass and also result in proper cutting action at the cutter blade tips without detrimentally beating the grass blades. Using a longer blade, e.g., a twenty-one inch blade, an r.p.m. of approximately 1400 will give a desired proper cutting and suction action at the blade tips. Of course the cutting edges must always be sharp or the grass will be torn, not cut. Most of the grass clippings will be as long as the difference between the height of the grass and the height of the cut. In this mower construction, the grass clippings are distributed across the swath of cut due to the interior fin design of the housing. This not only helps keep the housing clean but also lays the clippings down in a wide discharge so that they are not windrowed, or laid in clumps or piles. They are long enough that they can be raked easily or swept up with a sweeper if desired. The raised trailing edge 142 of the blade 136 which causes the suction and pulls the grass up to be cut off, also causes a combination axial and centrifugal puff of air as it passes each fin, and this in turn creates a discharge flow and sufficient turbulence where the blade passes the fins to prevent static accumulations of cuttings. The principle can be carried further and the fins run from the central portion in a swirling pattern, so that the discharge would be in all directions. The only difficulty with this would be that the fins would have to extend beyond the sides of the mower housing to give the same protection to the operator as is obtained in the front and rear. If this were done, it would be impossible to trim within ¼" of an object as is possible with the present construction.

FIGURE 8 illustrates the flow of air under the mower housing. The major extent of working air flow is in a narrow circular zone around the inner surface of skirts 148 however the fan blade trailing edges 142 which create a suction from ground level up into the housing act as a centrifugal pump as well as an axial suction fan hence will discharge air out between fins 160—164 as well as toward the upper housing wall 70. Some of the grass clippings cut on the forward half revolution of a blade 136 will be discharged forwardly with the flow of air out of the front discharge 150 however as the blade ends 136 pass under the tapered portion 182 of fin 164 and approach the large end portion 172 of fin 162 a live swirl 188 results between the upper portion of the blade 136 and the upper housing wall 70 moving clippings inward to a low pressure, effectively dead, air space near the center of the mower where a portion of the clippings drop to the ground. Additional grass is cut as the blade passes beyond the swirl area 188 beyond the large portion 172 of fin 162. The air flow from this position around to the opposite swirl area 188' is up from the ground into the blades 136 and tangentially out of the rear discharge 152. Cut clippings which were dropped in the center dead air space are picked up on the rear travel of cutter 60 and with those carried by the air flow between fin 162 and skirt 148 are centrifugally pumped out of the rear discharge 152. Some clippings picked up on the rear travel of cutter 60 are carried around and discharged between forward fins 160 and 162.

*Adjustable Wheel Mounting*

Each of the four wheels 54 are independently mounted on the mower housing 52 at the aforediscussed respective wheel assembly housing supports 154 and 154'. The front wheels are arranged as a coaxial pair or set and the rear wheels are arranged as a coaxial pair or set, the mounting components of all wheels being identical.

Each of the housing supports 154 and 154' have an external vertical channel 194 (see FIGURES 2–6) intersected adjacent the upper edge of the support 154 by a partially circular recess 196. Flat co-planar areas 198 and 200 are disposed vertically adjacent the front and rear edges of channels 194. The upper portion of each of the wheel support structures 154 and 154' are formed as longitudinally extending ridges 202 and 202' at each corner of the mower housing 52.

A gear rack 204 (FIGURES 4 and 6) fits with a sliding tolerance in each of the vertical channels 194 and receives the end of a stub axle 208.

Each set of ridges 202 and 202' have laterally disposed coaxial apertures 218 extending from the center of circular recesses 196 to a position above the upper housing wall 70 and an adjustment shaft 220 extends between and projects through the apertures 218 of each set of wheel support structures 154 and 154'. Each end 222 of shaft 220 which projects into associated recess 196 is non-rotatably secured to a gear 228 disposed in the recess 196. The gears 228 on each end of each shaft 220 mesh with their associated racks 204 and are retained on the shaft ends 222 by securing plates 230 and 232 fastened to respective front and rear flat co-planar areas 198 and 200 on the sides of channels 194 and over recesses 196 by screws. Both of plates 230 and 232 on each support cooperate with the respective channel 194 to form a vertical slide-way in the housing 52 to retain and guide the rack 204. Thus, rotation of adjustment shaft 220 will simultaneously rotate the two gears 228 of the lateral wheel set causing the gears to conjointly move along their racks 204 and, through shaft 220 to raise or lower the mower housing 52 relative to the ground engaging wheels 54 on each gear rack 204.

The preferred and disclosed wheel construction 54 utilizes a plastic disc 236 with a tire 242 made of rubber.

*Cutting Height Adjustment*

A U-shaped lever 250 straddles an index member 252 which has base flanges 254 resting on the housing upper wall 70 and fastened thereto by screws. Shaft 220 is fitted through the aperture 218 of one ridge, through one of the lever collars 248, under the index member 252 through the other lever collar 248 and through the other ridge aperture 218. Aligned holes in the lever collars 248 and shaft 220 enable lever and shaft to be non-rotatably fixed as by split spring type pins 258 or other suitable fasteners.

One half 268 of index member cylindrical surface 260 has a longitudinally aligned row of conical depressions drilled on axes passing through the axis of adjustment shaft 220. A thumb screw 272 with a conical end is threaded through the cross arm 276 of the U-shaped lever 250 above the row of depressions and the lever 250, shaft 220 and end gears 228 can be positively located and clamped in desired positions by engagement of the screw end 274 with one of the depressions 270.

For normal lever mowing, both levers 250 will be set and clamped at the same height indicia on index member 252. The illustrated embodiment shows cutting height settings at ¼ inch increments between ¾ inch and 2¾ inches but it is to be understood that the incremental difference could be some value other than ¼ inch, e.g. ⅛ inch, or with other forms of clamps the increments could be variable. By setting the rear lever at a higher cut than the front lever, high stands of grass can be cut by creating a large area discharge on the rear half of cutter rotation and thus provide more power for cutting on the forward half of cutter rotation. Regardless of this feature, it is to be understood that proper mowing technique for even cutting of lawns requires the mower height setting on all wheels to be equal.

*Motor Housing and Cooling*

Although the illustrated external shape of motor housing 58 is designed to give a pleasing appearance, other features of the housing, in cooperation with the mower housing 52 and the motor assembly 56, serve a functional purpose.

As has been described, motor 72 is secured on a depressed portion or sink 71 in mower housing wall 70 with its shaft axis in a vertical position. The upper motor casing bell 292 has openings through which air can enter and pass through the motor stator and rotor, drawn by a fan on motor shaft 86 in the lower bell of the motor and discharged out through forward openings in the lower motor casing bell 72. Integral with and upstanding from the sink portion 71 of the mower housing upper wall closely adjacent the lower motor bell 72 and contoured to fit closely beside bell 72 on each side of the lower motor openings 296, are two vertical bosses 300 and 302 (FIGURES 2 and 7) which serve as end baffles for an air outlet passage 304. A curved deflector plate 306 is secured by screws to the tops of end bosses 300 and 302 and with the bosses 300 and 302 and the encompassed portion of mower housing upper wall 70 define the passage 304 which directs air flow from the lower end of motor bell 72.

The capacitor 74 is located behind one boss 300 and the transformer 76 and associated rectifier 78 are located behind the other boss 302. Motor housing 58 is placed over all components of the motor assembly 56 and has lower edge flanges 308 which are used to secure the motor housing to the mower housing 52 by means such as screws. The motor housing lower edge 310 fits over a ridge in the upper surface of the mower housing wall 70 and its rear wall 312 can be integral or it can be a separable sheet metal plate, corrugated if desired.

The forward portion 314 of motor housing 58 is curved and its inner surface has a close fit with the outer edges of bosses 300 and 302 and with the deflector plate 306 to confine air flow through the passage 304 and out of the motor housing 58 through a bottom row of apertures 316.

An opening in the top wall of housing 58 is coaxially disposed above the motor 72 and is surrounded by an annular upstanding flange 320, notches 322 being disposed at front and rear locations to provide clearance for light bulbs 338. A bracket 324 is secured on the upper casing bell 292 and has a threaded center hole for attaching a motor housing cover 328. Cover 328 has an annular depending peripheral flange 330 of greater diameter than the upstanding motor housing flange 320. Integral support lugs 332 on the inside of cover 328 rest on housing flange 320 and maintain the spaced relationship between the cover 328 and housing 58 illustrated in FIGURE 6 when the cover is secured to motor bracket 324 by a screw 334. The cover flange 330 overhangs the housing flange 320, providing a baffled annular air inlet to the upper end of motor 72, which prevents entry of rain and effectively prevents entry of grass clippings and other debris.

*Handle Assembly*

Handle assembly 62 is fabricated from several separable components and its basic framework consists essentially of tubular stock. The lower frame is a single tubular member bent to provide a cross bar (hidden by panel 64) with two side legs 380. Ends 382 of legs 380 are flattened and apertured to pivotally fit on studs 386 of handle brackets 388.

A handle bracket 388 (FIGURE 1) is secured to an associated mower housing pad 392 on each side of and midway between the front and rear of mower housing upper wall 70.

The upper part of handle assembly 62 consists of two lower tubular members 416 with reduced diameter ends telescoped into ends of two upper tubular members 422. Lower ends 424 of the lower tubular members 416 are pressed together and curved to match the tubular contour of side legs 380 of the lower frame, and are secured to the side legs 380 by bolts and nuts. From the position of attachment to the lower frame, the two sets of lower and upper tubular members 416 and 422 converge to a position adjacent the upper extremity at which position the two upper members 422 are welded to a small cylindrical sleeve (not shown) which is aligned longitudinally of the handle assembly 62. Immediately above the welded joinder, the ends 430 of upper tubular members 422 are bent in a divergent manner to provide handle bars.

The two upper members 422 being welded together become a rigid assembly and when the lower members 416 are telescoped into ends 420, and fastened thereto as by screws, and lower member ends 424 secured to the lower frame, a rugged, a rigid handle assemlby frame results.

Many prior devices which incorporate handle bar control utilize some type of control lever easily manipulated at the handle bar but such prior art devices have some complex linkage, wire or cable control. The following construction provides a positive handle bar lever control which is far superior to ordinary flexible wire or cable controls which can jam or twist and which are used on most power mowers for clutch, brake, throttle and other controls.

Briefly, the handle bar lever control includes an adjustable rod 434 used to operate a spring loaded motor control switch, to be later described, and for apparent reasons is disposed to one side of the handle assembly center line, however the rod 434 can be formed to extend in other directions from adjacent the welded sleeve. The spring loaded switch biases rod 434 to an upper position, and the switch is actuated against the spring bias by pushing on knob 446.

Similar dual control levers 452 are provided on each handle bar 430, either or both of which can be used to push the control rod 434 against spring bias by pulling the lever handle toward the handle bar 430. The weight of the lever handles will cause levers 452 to hang by gravity in an inoperative position which is generally horizontal. The other ends of the two levers extend over the top of the actuating rod knob 446 and when either of the levers 452 is pulled up toward the handle bars 430 the ends engage knob 446 and push the rod 434 down against spring bias to actuate the control switch.

*Electrical panel.*—Several of the electrical circuit components are carried in a panel 64 situated on the lower handle frame.

Enclosed within the panel 64 is a double pole, double throw, spring biased, plunger actuated running switch 492 (see FIGURE 10) positioned so its spring biased plunger is engaged by and aligned with the lower end of the described control rod 434. It is the spring biased position of switch 492 that holds the aforedescribed control rod 434 and knob 446 in the upper position under control levers 452.

Also mounted on the interior of shroud 468 is a starting switch 498 (see FIGURE 10) with a spring biased plunger 500 disposed immediately below and aligned with a dielectric plunger 486 (see FIGURE 1). Starting switch 498 is a single pole "on-off" switch, spring biased to an "off" position. Depression of dielectric plunger 486 from exterior of panel 64 will place the switch in an "on" position.

The lines and circuits which interconnect the switches 492 and 498 and the motor assembly will be fully described in a subsequent section of this specification, sufficient at this time is the fact that electric lines from inside the panel 64 are grouped into two cables 501 and 502 which pass out of the lower corners of panel 64 down the inside of the associated lower frame legs 380 and then pass through side holes 510 in the motor housing 58. The ends of leads in each of cables 501 and 502 are appropriately connected to the motor 72, transformer 76 or rectifier 78.

A two wire electric cable 514 (FIGURE 1) passes through one of the handle bars 430, through upper tubular member 422, into lower tubular member 416, out through an inside hole in the lower member just above the panel 64 and terminates in a female connector plug 518 which connects over a pronged connector in the panel 64. A sufficient length of cable 514 is exposed between the lower tubular handle member 416 and the plug 518 to enable disconnection of the telescoped ends of the associated tubular members 416 and 422 for disassembled shipping.

*A handle bar plug connector and strain relief* is provided at one of the handle bars 430. Shown in FIGURE 1 the upper length of the two wire cable 514 terminates in a heavy molded rubber strain relief extension member 520 which has a three pin plug connector 522. The heavy molded construction of the extension cooperates between the cable 514 and the end of tubular handle bar 430 to eliminate bending of the cable at right angles and to thereby prevent breaking of the wire inside of the cable which occurs upon large angle constant flexing. Extension 520 also eliminates the possibility of the end of handle bar 430 wearing through cable 514 and shorting the power circuit. Strain relief extension 520 is of sufficient length to place plug connector 522 to one side of the handle bars 430 extending beyond the track of the mower for a purpose to be explained.

To prevent occurrence of abrupt bends in the strain relief member 520 where it enters handle bar 430 a metal splint 538 has one end contoured to fit over and is fastened to handle bar 430 by a screw. The other end is contoured to fit over the upper portion of approximately one-half of the strain relief member 520 and is secured at its end by a circular clamp 546.

A continuous grounding circuit is provided from the mower housing 52 and through the handle assembly 62 to the ground pin in strain relief plug 522.

Suitable handle grips 548 and 549 are placed over the ends of handle bars 520, grip 549 covering the end portion 540 of splint 538.

Some previously known electric mowers have a short lead-in length of electric cable with a plug end while others have longer extensions of cable. With either arrangement a long extension cord is normally used and the weight of the extension cord pulling through the grass will cause it to disconnect at the plug connection to the lead-in cable to the mower. To eliminate this it has become a frequent practice to tie the plug ends of the lead-in and extension together. This practice is undesirable because it eliminates the safety of a quick dis-connect and presents a hazard from the standpoint of wearing through the wiring and causing a short.

When an extension cable plug 566 is connected to the handle bar strain relief extension plug 522, the hooked ends of springs 556 are anchored between a wing clamp 562 and wing lugs 552 to provide a spring loaded power line connection. Springs 556 are designed to pull the full weight of an extension cable of a convenient length, say 150 feet and will also withstand slight jerks on the cable. However, in case the mower is run to the extreme limit of the cable extension or in case of emergency the tension spring will give and permit a quick disconnection of power to the mower.

It is proposed that a considerable length of three-wire extension cord 564 be used in operation of mower 50, the third wire being utilized for a positive grounding connection of the mower from a ground pin in strain relief extension plug 522. To provide storage of the cord 564 to keep it away from the area being mowed and to enable convenient availability of cord 564 as mowing progresses, a cord storage reel 572 is used (FIGURE 1).

Reel 572 consists of a curved drum portion 574 with bell shaped annular side flanges 576, the drum being rotatably mounted on a lateral tubular support 578 which has a vertical standard 580. Approximately 5 inches of the end of standard 580 fits in a pipe 582 driven into the ground. An integral annular rib 584 on standard 580 abuts the top edge of pipe 582 to limit the position of the standard in the pipe. Thus mounted, the reel 572 can rotate on a horizontal axis on support 578 and the reel and standard can swivel on a vertical axis in pipe 582.

The reel end of three wire extension cord 564 is fastened to drum 574 by a clamp 586. It then passes through a slot in the drum to the drum interior. Within drum 574 is a slip ring structure (not shown and not specifically a part of this invention) which can have either double or triple parallel paths from the rotatable reel to the fixed support. Regardless of whether double or triple parallel paths are utilized, the ground lead in extension cord 564 is electrically connected to the reel 572 and will hence be grounded through standard 580 and pipe 582. A three wire lead-in cord 588 passes through an aperture 590 in standard 580, through tubular support 578 and has one wire grounded to the interior of reel 572 and at least the other two wires connected through the slip rings to the power leads of extension cord 564. A three pin grounding plug 592 is fixed to the end of lead-in cord 588 for connection and grounding to a power outlet.

When using the mower 50 and reel 572, the reel support pipe 582 is driven in the ground near the power outlet 594 and the reel 572 installed for swivel movement on a vertical axis. To prevent free coasting of the reel 572 at the end of a period of unwinding a demanded amount of cord 564, a form of friction device such as the spiral compression spring 596 (FIGURE 1) can be fixed on the tubular support 578 to bear against the reel 572.

*Electric Motor and Circuits*

That phase of this invention encompassing the motor control and regenerative-dynamic braking circuitry and providing dual safety factors of a "Dead Man" running switch and an overload cut-out is not restricted to capacitor start motors but includes all types of induction motors whose electrical design will permit use of regenerative braking. As is known, regeneration in an induction motor is the ability of the induction motor to operate as an induction generator, and occurs only when there is a leading phase component of current. One way of obtaining the leading phase component of current is through a suitable capacitor. In capacitor start motors, the capacitor is already present and in other induction motors a capacitor can be furnished. The braking effect of regeneration occurs because of circulating currents in both the primary and secondary windings of the motor. While regenerative braking is very effective at high speeds, it has very little effect at low speeds. Because of the latter undesirable characteristic, this invention proposes the use of dynamic direct current braking, employed in combination with regenerative alternating current braking. Dynamic braking can be obtained in an induction motor by applying direct current to either or both primary windings. This braking method is effective over the entire speed range of the motor, however, to keep the D.-C. power supply requirement at a low value to decrease component cost and size, this invention uses dynamic braking only in the lower speed range, relying upon regenerative braking in the higher speed range. A low cost transformer and selenium rectifier are used in this mower with appropriate switches in the circuitry to supply the necessary D.-C. This combination A.-C., D.-C. braking can be achieved by various circuits, several of which are disclosed hereinafter.

With reference particularly to FIGURE 10, a schematic diagram of the electrical circuit as used in the lawn mower is illustrated. Previously designated switch 492 is a double pole double throw switch normally biased as by spring 610 to its illustrated "non-run" position. Switch 492 is the "Dead Man" switch actuated by hand levers 452 through push rod 434 and must be held in an "on" position to permit the motor to start or to continue running once started. Switch 498 is a foot operated switch which is biased as by spring 612 to its normally open position, and is closed only during the starting cycle.

Contactor 614 is the movable element in a centrifugal switch which in this embodiment is the conventional speed responsive switch used in a capacitor start induction motor and is adjusted to transfer from start contacts 615 and 616 to running contacts 617 and 618 at a speed of approximately 600 r.p.m. The induction motor 72 comprises a main winding 620 and the auxiliary starter winding 622 with series capacitor 74.

The junction between main winding 620 and starter winding 622 at capacitor 74 is connected by lead 624 to blade 626 of the hand operated running switch 492. The other lead to main winding 620 extends from contact 617 of the centrifugal switch to blade 628 of running switch 492.

One side of the line voltage is connected directly to contact 630 associated with blade 626 so that when running switch 492 is transferred, one side of the line is directly connected through lead 624 to the common junction between motor windings 620 and 622. The other side of the line voltage is connected directly to terminal 618 of the centrifugal switch so that once contactor 614 transfers to contacts 617 and 618, line voltage is supplied across main winding 620. At speeds up to about 600 r.p.m. contactor 614 is in its illustrated position and hence the line connection to contact 617 during the starting cycle is through switch 498 which is held closed by the operator's foot until the centrifugal switch is actuated.

Actuation of foot operated switch 498 connects the other side of the line voltage to blade 628 of switch 492. When switch 492 is closed to its non-illustrated position, the circuit energizing starter winding 622 is completed from contact 632 through contacts 616 and 615 of the centrifugal switch and back through lead 624 and blade 626 to contact 630 of switch 492. Thus, simultaneous actuation of both the hand controlled switch 492 and the foot controlled switch 498 is necessary before the motor can be started. Once the motor speed reaches approximately 600 r.p.m. contactor 614 of the centrifugal switch transfers, and it is no longer necessary to hold foot operated switch 498 closed as power is supplied to the main winding 620 through contacts 618 and 617 and starter winding 622 becomes de-energized.

Once the motor reaches operating speed, it continues running until either it is overloaded to the extent that its speed reduces below the drop-out speed of the centrifugal switch whereby contactor 614 drops back to contacts 615 and 616 and the circuit is interrupted at contact 618 or until hand controlled switch 492 is released to return to its illustrated position. When switch 492 is transferred to its illustrated position, switch blade 626 transfers from contact 630 and thus breaks the circuit from the input power regardless of whether foot operated switch 498 is closed to remove the electrical power input to the motor.

When blade 628 of switch 492 is on contact 634, the main winding 620 and starter winding are in parallel whereby regeneration braking is obtained due to the action of capacitor 74 producing a leading phase component of current. The regenerative braking effect is the result of losses occurring in the motor because of the circulating currents in both of the motor windings which at this period are connected across each other. While the regenerative braking thus obtained is quite effective at high speeds, its effectiveness reduces markedly at slower speeds.

To produce effective braking at slower motor speeds, circuit connections are provided to supply a D.C. current through main winding 620 by means of a circuit including lead 624, blade 626 and contact 640 of switch 492 to one terminal 642 of a D.C. voltage source and from the other D.C. voltage terminal 644 to lead 646, contacts 616 and 615 and the contactor 614 of the centrifugal switch, lead 648, contact 634 and blade 628 of switch 492, and contact 617 to the upper side of motor winding 620. The dynamic braking effect is the result of losses in the motor windings caused by the current generated in the rotor windings due to the rotor conductors cutting the magnetic field set up by the direct current in the main winding 620. Dynamic braking is, of course, effective over the entire speed range, but in order to keep the D.C. power supply and associated circuit components of small size and inexpensive, the dynamic braking is used only at lower speeds and is made effective only after contactor 614 of the centrifugal switch transfers to contacts 615 and 616.

While any suitable source of D.C. voltage may be used, in the lawn mower described the D.C. voltage is obtained from a small transformer 76 having a primary winding 650 directly connected across the input power lines and two secondary windings 652 and 653. Secondary winding 652 contains a center tap 654 which is connected directly to terminal 644 and the end connections of secondary winding 652 are connected through the elements of rectifier 78 to a common junction 658 which is connected to terminal 642. The rectifier elements are preferably of the dry disc type and since the D.C. voltage is only approximately 3.9 volts, the D.C. current amounts to no more than 3 or 4 amperes.

It may be noted that anytime the electrical cord on the lawn mower is connected to the electrical power lines transformer 76 is energized and light bulbs 338 connected across secondary winding 653 will be energized. Also, so long as hand-operated switch 492 is left in its illustrated spring biased position and centrifugal switch contacts 614 are in the illustrated position, the D.C. voltage providing dynamic braking is applied to main winding 620 of motor 56.

Summarizing the operation of the circuit, one side of the line voltage is applied through foot-operated switch 498 to terminal 617 and main motor winding 620 and to terminal 632 and blade 628 of hand-operated switch 492 and contacts 616 and 615 of the centrifugal switch to starter winding 622. The other side of the line is applied through contact 630 and blade 626 of the hand-operated switch and lead 624 to the common junction of the motor windings. When the motor speed reaches about 600 r.p.m., contactor 614 transfers to thereby disconnect starter winding 624 from the circuit and connect the one side of the line from contact 618 directly to winding 620 of the motor through contact 617. Foot-operated switch 498 is by-passed and remains completely ineffective so long as the motor is running above the drop out speed.

Terminal 644 of the D.C. power supply is connected through contact 632 and blade 628 to contact 617 on one side of A.C. line to therefore provide a common reference potential. Terminal 642 of the D.C. power supply is, however, connected only to terminal 640 of switch 492 and consequently the rectifiers are fully protected from the motor circuit until slow speeds are reached.

The mower motor is ordinarily turned off by hand-operated switch 492 transferring to its illustrated non-running position and foot-operated switch 498 is in its illustrated position. When switch 492 transfers, the circuit to the main motor winding is disconected from the power line at contact 630; starter winding 622 with capacitor 74 is connected in parallel with winding 620 through a circuit including lead 648, contact 634 and blade 628 of switch 692 and terminal 617 whereby a circulating A.C. current having a leading current phase is developed to produce regenerative braking. Until the motor speed has reduced to the drop out speed of the centrifugal switch, the D.C. power source is disconnected from the motor windings since the circuit from D.C. supply terminal 644 is broken between contacts 616 and 615 of the centrifugal switch. This protects the rectifiers from the high A.C. voltage present in the motor during the regeneration braking period. When contactor 614 bridges contacts 615 and 616 the D.C. voltage is applied to main winding 620 from contact 615, lead 648, contact 634 and blade 628 of switch 492 to contact 617 and through lead 624, arm 626 and contact 640 of switch 492 to the D.C. supply thereby applying the dynamic braking effect. This circuit is designed so that so long as the motor is plugged in and not running there will be a very low D.C. voltage on the main motor winding 620. This, however, constitutes no hazard since the current flow is so small that there is no overheating of the motor.

There is provided by this circuit an effective and fully automatic electrical braking system which uses the conventional items in a capacitor start motor and only inexpensive stock electrical components, which occupy little space, require no maintenance and have long life, and consume inconsequential quantities of power.

The improved combination regenerative and dynamic braking system can also be embodied in other circuits which for some uses, and particularly those apart from the lawn mower field, may be more convenient when only a single control switch is provided. The circuits of FIGURES 11, 12 and 13 each provide regenerative braking at high speeds when the source of power is first disconnected from the motor and dynamic braking when the motor speed reduces to the point when the centrifugal switch recloses.

Referring now to FIGURE 11, the motor comprises a main winding 660, a starter winding 662 and capacitor 664 connected together at a common junction 666 and connected by lead 668 to terminal 670 of the input A.C. power line. The centrifugal switch has an inertia controlled contactor 672 which is in contact with terminals 674 and 676 at low speeds and in contact with terminal 678 at speeds greater than its transfer speed.

Switch 680 has two blades 682 and 684 which are ganged together for movement across terminals 686, 688 and 690, and 692, 694 and 696 respectively. Blades 682 and 684 are in the "off" position when in contact with terminals 686 and 692 respectively, in the "run" position when in contact with terminals 688 and 694 respectively, and in the "start" position when in contact with terminals 690 and 696 respectively. Terminals 688, 690 and 696 are connected to terminal 698 of the input A.C. power line. Terminal 694 is unused, not being connected to any circuit component. Terminal 686 is connected by lead 700 to the starter winding and to terminal 676 of the centrifugal switch and blade 682 is connected to terminal 678 of the centrifugal switch. Terminal 692 is connected by lead 702 to one side of the D.C. power supply while the other side of the D.C. power supply is connected to lead 668. Blade 684 is connected to terminal 674 of the centrifugal switch.

Transformer 706 has its primary winding 708 connected across the input A.C. power lines 670 and 698, and its secondary winding 710 connected to a conventional full wave rectifier bridge 712.

To start the motor, switch 680 must be moved to its "start" position where blades 682 and 684 contact terminals 690 and 696 respectively, whereby power is applied from input terminal 698 to terminal 696 and blade 684 of switch 680, and from terminals 674 and 672 of the centrifugal switch to main winding 660 and from terminal 676 through starter winding 662. In this embodiment junction 666 on the other side of the motor is permanently connected to terminal 670 of the A.C. input power supply.

After the motor speed increases and contactor 672 transfers to contact 678, switch 680 may be moved to its middle or "run" position where it stays until the motor is to be turned off. Switch 680 is preferably constructed to have stable positions at "run" and "off" and to be turned to the "start" position only against a spring bias. Hence, once the motor has attained its operating speed, the switch is released to its "run" position. In the "run" position, power from terminal 698 of the power supply is connected from terminal 688 and blade 682 of switch 680 to terminals 678 and 672 and to motor winding 660. No power is supplied to starter winding 662 after contactor 672 of the centrifugal switch transfers.

If the motor is overloaded to the extent the centrifugal switch transfers, no A.C. power is supplied to either winding and the motor therefore rapidly comes to a stop due to the overload condition.

If switch 680 is moved to its "off" position, the circuit from input supply terminal 698 is interrupted. Switch blade 682 contacting terminal 686 then establishes a circuit connection from main winding 660 through contacts 672 and 678 of the centrifugal switch and lead 700 to starter winding 662 whereby a circuit providing regenerative braking is provided. When the motor speed reduces so that contactor 672 transfers to contact terminal 674 of the centrifugal switch, then a circuit is completed for supplying D.C. across main winding 660 through lead 668, lead 704 to one terminal of rectifier bridge 712, and from the other terminal of the rectifier bridge through lead 702, terminal 692, blade 684 and terminal 674 and contactor 672 of the centrifugal switch.

The circuit of FIGURE 11 as well as the circuit of FIGURE 10 incorporates the safety feature of a special start position, in other words, merely turning the operator's switch 680 to a "run" position is inadequate to start the motor. Hence any time the motor speed has been greatly reduced, as for example due to an overload, the motor is removed from the line and cannot be restarted until the operator deliberately moves his switch to the special "start" position. Also the motor is decelerated to a standstill quickly by means of first, the regenerative braking and subsequently, after the centrifugal switch recloses, by dynamic braking; and the D.C. circuit components are protected against the large magnitude alternating voltages and currents by being disconnected from the motor circuit during starting and during stopping until low motor speeds are reached.

FIGURE 12 is a further embodiment of a circuit incorporating the combination regenerative and dynamic braking. Here the main motor winding 720, starter winding 722, capacitor 724 and the connection of the common junction 726 by lead 728 to terminal 730 of the input A.C. power supply are all the same as in FIGURE 11. The transformer primary 732 is connected across the A.C. input and its secondary 734 is connected to a full wave rectifier bridge 736, one terminal of which is connected to lead 728 and the other to terminal 740 of switch 742. Switch 742 is a DPDT switch having an internal connection from blade 744 to terminal 746, a connection from terminal 748 to starter winding 722, and a connection from terminal 750 to one side 752 of the A.C. input line.

The centrifugal switch 751 in this embodiment may be of the type conventionally used in capacitor start motors since it carries only one set of normally closed contacts which are adapted to open when the motor reaches a predetermined speed and close anytime the motor speed reduces below the reclosing speed.

When switch 742 is turned to its "on" position, power is applied from input terminal 752 through terminal 750 and blade 744 of switch 742 to main winding 720 and from blade 744 to terminal 746 and blade 754 of switch 742 and centrifugal switch 751 to starter winding 722. By the time operating speed is reached centrifugal switch 751 will have opened thereby de-energizing the starter winding 722.

When the motor is stopped by turning switch 742 to its "off" position, main winding 720 is connected to starter winding 722 through blade 744 and terminal 748 of switch 742 to thereby provide the regenerative braking effect resulting from circulating alternating currents. The D.C. voltage is applied from rectifier bridge 736 through lead 728 to one side of the main winding 720 and from terminal 740 and blade 754 of switch 742 to the centrifugal switch 751 and back through lead 756 to terminal 748 and blade 744 of switch 742 to main winding 720. Thus, after the motor speed has been reduced to the reclosing speed of the centrifugal switch 751, the D.C. braking voltage is automatically applied to main winding 720 to thereby provide dynamic braking and rapid stopping of motor.

Referring now to FIGURE 13, the circuit is identical in operation to the circuit shown in FIGURE 12 except that the primary winding 760 of transformer 762 is energized only when switch 764 is in the "off" position. Switch 764 is a 3 PDT type having terminals 766 and 768 associated with blade 770; terminals 772 and 774 associated with blade 776; and terminals 778 and 780 associated with blade 782.

Terminal 766 is connected to the main motor winding 784 and terminal 768 is connected to one side of the primary winding 760 whereby transformer 762 and the main motor winding 784 are never simultaneously energized from the A.C. input line. Terminal 766 is also connected to blade 776 so that when switch 764 is in the "on" position, one side 777 of the A.C. input line is connected from terminal 772 through centrifugal switch 786 to starter winding 788. The starter winding is also connected to terminal 774 so that when switch 764 is in the "off" position, starter winding 788 will be connected across the main winding 784 to produce the regenerative braking action.

Terminal 778 is connected to terminal 790 of the A.C. input and blade 782 is connected to the common winding junction 792 in the motor to thereby complete the circuit supplying A.C. power across main motor winding 784. Terminal 780 of switch 764 is connected to one side of the full wave rectifier 794 which is supplied with a low D.C. voltage from secondary winding 796 of transformer 762.

When switch 764 is turned to the "on" position, power is supplied from input terminal 777 to blade 770 and terminal 766 to main motor winding 784 and from junction 792 through switch blade 782 and terminal 778 to the other A.C. input terminal 790. The starter winding 788 is also energized through the circuit extending from terminal 766 to blade 776 and terminal 772 of switch 764, the closed contacts of centrifugal switch 786 and to junction 792. Energization of the starter winding 788 is interrupted when centrifugal switch 786 opens as the motor accelerates and the motor then operates while transformer 762 remains de-energized.

When the switch 764 is thrown to the "off" position the motor is disconnected from both sides 777 and 790 of the input line since switch blades 770 and 782 are transferred to terminals 768 and 780 respectively. With switch blade 770 in contact with terminal 768, the primary of transformer 762 is energized to thereby produce the D.C. voltage in rectifier bridge 794. The auxiliary starter winding 788 and capacitor 798 are connected in parallel with the main winding 784 through a circuit including switch terminal 766, blade 776 and terminal 774 with the result that regenerative A.C. braking occurs immediately and the rotor speed of the motor is reduced.

One terminal of the D.C. power source is connected by lead 800 to centrifugal switch 786 while the other lead is connected directly to terminal 780. Terminal 780 is connected by blade 782 to junction 792 on one side of main winding 780 while the circuit from the other side of the D.C. power supply from lead 800 is through centrifugal switch 786, lead 802, terminal 774, blade 776 and terminal 766 of switch 764. Thus, as long as motor speed is above the centrifugal switch closing speed, no direct current will flow through main winding 784. This protects the rectifier bridge 794 from high A.C. voltages occurring on the main winding during regenerative braking to thereby make possible the use of dry rectifiers such as selenium or copper oxide. When centrifugal switch 786 closes, the D.C. voltage is impressed on main winding 784 with the result that dynamic braking is effected and the rotor speed is quickly reduced to stand still.

While the foregoing circuits, illustrating the combination regenerative and dynamic braking, are all described in connection with capacitor start motors, they are adaptable to any type of induction motor as the starter winding and capacitor could be replaced by any other suitable load circuit providing a leading phase current. The electrical components for the described systems are standard items and consequently inexpensive. The combination regenerative A.C. and dynamic D.C. braking system requires no maintenance, is readily usable on portable apparatus, consumes very low power and occupies very little space. These circuits are therefore well adapted for use with electric lawn mowers and other types of power tools where quick stops are important to operator safety and where the expense, size or weight of the more elaborate systems would be economically prohibitive on items which are priced to meet the average homeowner market.

Considering all of the foregoing factors including the detailed description of the illustrated embodiment, there has been disclosed a novel power mower together with many novel components having inventive concepts. Because for proper lawn maintenance, the height of the grass should be determined according to the season, growing environment, type of grass, etc., this invention enables easy, accurate height adjustment in a minimum time for any height of mower cut between ½ and 2¾ inches, and the precision "non-slip" index scaled for small increments of height change, such as ⅛" or ¼" center detents assures even mowing from start to finish, or permits easy rapid changes in height if different sections of lawn require mowing at different heights. The specially designed blade lets only the cutting edge touch the grass and eliminates beating and browning of the turf by the unsharpened portion. More power permits proper grass cutting speed, and avoids high blade speeds that tear the grass. A strong blade suction lifts grass upright to give a clean, even cut and reduces matting because it vacuums the lawn as it mows, pulling dead debris to the surface so it can be removed. It cuts a broad swath the width of the mower, hence no overlapping of wheel tracks is necessary. Special fin design gives immediate discharge of clippings primarily behind and also toward the front of the mower on an even pattern. No heavy static buildups of cut gooey grass occurs under the mower nor are unsightly clumps left on the lawn or thrown in bushes. The fin and housing are so constructed that the cutter blades will not eat down into turf leaving unsightly spots and they also restrict the throwing of hard objects. The specially designed housing has the blade recessed in the housing and the fins guard against getting a foot under the housing. Special shear pin arrangements and motor mounting eliminates most of shaft bending when mower is accidentally run into iron stakes or rocks.

For starting safety, novel circuitry has been conceived for an electric motor so the mower can be started only when a handle control is held and a starting button depressed. The starting button is placed a sufficient distance from the handle control so it can be depressed with the operator's toe and a person cannot inadvertently start the mower while any of his extremities are under the housing. The circuit incorporates a novel automatic electric brake which stops the blade in three seconds upon release of handle control, making it safer when mowing terraces and steep slopes. Should the motor drop below cutting speed due to moving too rapidly into extremely dense turf, the motor will cut out. This assures that the mower never operates at too low a cutting speed. A touch of the toe will re-start at proper cutting speed. The mower will start on grass by merely actuating two switches which eliminates the need to start on sidewalk or drive. Mowing lights are included to indicate power is applied to the motor circuit and to permit mowing after dark on short fall evenings or in the cool of a summer evening.

The electric powered mower embodiment has certain advantages over gasoline power rotary mowers. There is no starting problem because the capacitor start electric motor has a high torque starting rotation whereas many gasoline rotary mowers cannot be started on grass areas because the friction of the grass on the cutter blades will not permit sufficient rotational speed to start the engine. It is not possible to incorporate the safety features of the electrical brake and dual switch starting of this invention on gasoline engine powered mowers. Electric motors do not require the overhauling and maintenance of gasoline engines. An electric mower is silent as compared to a gasoline engine mower and does not emit fumes and odors of combustion products into the air. Since home type gasoline powered mowers provide no source of electric power they do not have lights for night mowing.

However, many of the features of this invention are applicable to gasoline powered mowers as well as to electric powered mowers. For instance the aerodynamics and safety guard created by the fins are applicable to both, the height adjustment is applicable to both, and the construction of control levers and rod on the handle assembly would be applicable to clutch operated devices on a gasoline powered mower.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A rotary mower for mowing lawn grass comprising: a powered rotary mower mechanism having support wheels; a blade housing supported by said wheels and providing a top wall, depending side walls and a plurality of forwardly and rearwardly directed depending air guide vanes defining a downwardly opening blade chamber, the sides and at least the outer portions of the vanes of which have terminal edges disposed substantially in a first plane close to and generally parallel to a plane tangent to the ground engaging portions of said wheels; a rotary blade mounted for substantially horizontal rotation in said housing chamber with the leading edges of its ends being sharp cutting edges disposed slightly above said first plane and the trailing portions of said ends having an abrupt upsweep shaped to provide fan blades for inducing an upwardly and generally outward flow of air between said vanes effective to raise and maintain the grass blades, which are to be cut and which are covered by said housing, to an upstanding position; said depending vanes being inclined in the direction of rotation of said blade and at least a portion of said plurality of vanes at front and rear extending above and closely adjacent the path of rotation of said upswept trailing edge; and power means connected to said blade to rotate said blade at a speed which assures a blade tip speed sufficient to induce a flow of air adequate to lift and hold the covered grass blades firmly in an upstanding position and assures a single clean shearing of the grass blades in the forward area of the housing by the leading cutting edges of said blade ends.

2. A rotary blade mower, comprising: a low speed rotary drive means mounted on a blade housing frame means; and a rotary blade mounted on a vertical axis, connected to and driven by said drive means and including sharply upswept end trailing edge flanges providing a relatively high, blade tip created suction to hold the grass up into the blade cutting path; said housing frame means including a plurality of depending airflow path control vanes inclined in the direction of blade rotation and having portions overlying said blade ends closely adjacent to and above the path of rotation of said flanges, cooperating with passage of said blade to enable proper cutting, and lateral distribution and discharge of the material being cut through passages between adjacent vanes.

3. In a power rotary mower, a low speed rotating cutter mounted for rotation about a vertical axis having abruptly offset ends with sharp leading edges and flanged trailing edges for providing a high strength axial and radial airflow and for severing grass blades with minimum recontact between growing grass and said cutter ends; and means including mower body structure and airflow vanes located adjacent the peripheral path of said rotating cutter and above and closely adjacent the upper sides of said flanged ends to confine and control airflow over the area to be cut which raises grass blades to an upstanding position and ejects cut grass particles substantially evenly, and substantially immediately after cutting, from said body structure for dispersed distribution over the lawn.

4. A mower comprising: a frame; a vertical drive shaft; an elongate cutter unit having a substantially flat major portion, two coplanar short blade edged ends on said cutter unit offset from said major cutter portion and essentially parallel thereto, an abrupt transition bend structurally integral with each said blade edged end and the adjacent major cutter portion, an integral trailing edge flange on each said short blade edged end sharply upswept in a direction toward the plane of said major cutter portion, and connecting means midway between said cutter unit ends securing said cutter unit on said drive shaft; fore and aft vaned discharge passage structures in said frame closely adjacent the path of said blade and having a plurality of depending vanes inclined from a vertical fore and aft plane in the direction of blade rotation at angles less than tangent to blade path periphery to thereby prevent tangential discharge of broken blades, stones, and like objects by said cutter unit at high speeds or velocity and said vanes being of sufficient vertical and horizontal length to depend below and adjacent said blade tip means and to depend to a position above and closely adjacent the path of said upswept trailing edge flanges to cooperate with said cutter unit to create sufficient confined airflow to raise and hold grass blades to be cut in upright position, thereby assuring a proper presentation of the individual grass blades to said blade tip cutting edge and a true, clean shearing of the blades and at the same time provide a laterally controlled distribution of discharge airflow out of the housing substantially horizontally through said plurality of vaned discharge passage structures to convey the sheared grass particles in a manner to effect a widespread essentially even discharge of clippings.

5. A rotary blade mower comprising: a horizontally rotating cutter blade unit; a frame having integral fore and aft sets of a plurality of vaned discharge ports, the vanes of which are disposed essentially vertically, have elongate outer end portions closely bordering the peripheral path of the cutter unit ends, the lower edges of said outer end portions being disposed lower than the cutter blade unit and set sufficiently close and at a suitable angle in a vertical plane inclined in the direction of rotation of the blade an amount approaching but less than tangential to the cutter blade peripheral path, and have inwardly extended vane portions disposed above the cutter path of rotation; and airlift means on said cutter unit ends having a path of rotation under said inwardly extended vane portions; successive downstream vanes having a greater inwardly extended vane portion disposed closely above said path of rotation of said airlift means than the immediately preceding upstream vane.

6. A rotary blade power mower comprising: a wheeled mower frame supporting a low speed power unit drive connected to an elongate horizontal cutter unit with diametrical cutter blade ends disposed under said frame; said blade ends including air lift means; said frame including dependent airflow fins, portions of which extend outwardly beyond and below the circular cutter blade path and other portions of which extend above and inwardly beyond the periphery of the circular blade path and above said air lift means; and said fins being inclined relative to a vertical plane parallel to the operative path of movement of said mower end in the direction of rotation of said blade a sufficient amount to block the path of foreign particles tangentially discharged from the rotating blade and to also provide narrow width paths through said fins in a direction parallel to the path of operative mower movement.

7. A power mower as defined in claim 6, wherein said wheeled mower frame includes an adjustment mechanism between said frame and support means enabling selective positioning of said blade and vanes relative to the ground engaging support means to provide desired airflow for proper operation, including at least two laterally spaced motion transmitting linkages, means connecting both said linkages so at least one member of each has conjoint rotation on a common axis fixed relative to said mower frame, and means securing at least one member of each linkage to said mower support means; means in control connection with said mower power means to effectively prevent and automatically brake operation of said rotary blade when the operator is out of operating position; and a handle assembly swingably secured on said frame and shiftable from one end to the other and having handle grips with adjacent manual control members in operative connection with said means in control connection with said power means.

8. A rotary mower comprising: a frame; cutting mechanism; power means on said frame drive connected to said cutting mechanism; said cutting mechanism including a diametral rotary cutter with cutting blade edges on each of its ends being a minor fraction of the cutter diametral dimension; the plane of rotation of said cutting blade ends being disposed below the plane of rotation of the major cutter portion; and said frame having a closed top wall and including depending solid walled side skirts and fore and aft vane elements closely adjacent the perimeter of the rotary blade path extending to positions lower than the plane of rotation of said cutting edges, at least some of both said fore and aft vanes having inwardly disposed portions extending above the path of the rotary cutter.

9. A rotary power mower as defined in claim 8, wherein portions of said vane elements extend along the lower surface of said top wall of said frame to positions above the plane of rotation of said cutting edges and said vane elements are provided with an inclination to a longitudinal vertical plane through the mower in the direction of cutter rotation but at angles offset toward the longitudinal vertical plane from tangential blade tip rotational discharge.

10. For use in a rotary mower, a cutter as defined in claim 8, wherein said cutter includes an abrupt transition bend between the cutting blade ends and the major cutter portion and each cutting blade end has a sharply upswept trailing edge faired into said abrupt transition bend to provide a high strength integral connection between said cutting blade ends and said major cutter portion.

11. A rotary power mower housing having mountings for ground engaging wheel structure and adapted to carry a power driven rotary cutter member which will rotate in a horizontal plane, said housing comprising: a substantially planar top wall; two walls at opposite sides of said top wall, integral with and substantially normal to said top wall with edges disposed in a common plane, substantially parallel with said top wall; said top wall and side walls providing a semi-covered blade chamber with open ends; and a plurality of spaced apart air control vanes extending substantially normal to said planar top wall from the inner side of said top wall and having portions of different depth, the portions of said plurality of vanes adjacent said at least one open end having the greatest depth and also having lower edges substantially in said common plane and the remaining portions of said plurality of vanes extending into said blade chamber away from said at least one open end and having appreciably lesser depths than said portions of greatest depth.

12. A rotary power mower housing as defined in claim 11, wherein said air control vanes have a substantial inclination in one direction away from a plane normal to said top wall and midway between said side walls.

13. A rotary power mower housing as defined in claim 12, wherein at least one of said air control vanes has its said outer edge disposed approximately midway between said side walls and extends toward one of said side walls due to vane inclination and passes with a smooth gradual curve away from said side wall to a terminal position adjacent the other of said blade chamber ends.

14. A rotary power mower housing as defined in claim 13, wherein said one vane has a portion immediately adjacent its said portion of greatest depth depressed substantially to said top wall, the said one vane then increasing to a depth over the remainder of its extent which is appreciably less than said portion of greatest depth.

References Cited in the file of this patent

UNITED STATES PATENTS

| | | |
|---|---|---|
| 656,140 | Kennedy | Aug. 14, 1900 |
| 1,001,125 | Danielson | Aug. 22, 1911 |
| 1,190,908 | Kafader | July 11, 1916 |
| 1,940,455 | Kilpela | Dec. 19, 1933 |
| 1,989,823 | Raabe | Feb. 5, 1935 |
| 2,050,180 | Hurxthal | Aug. 4, 1936 |
| 2,265,443 | McGuire | Dec. 9, 1941 |
| 2,308,076 | Hainke | Jan. 12, 1943 |
| 2,511,160 | Grobowski | June 13, 1950 |
| 2,518,093 | Sutter | Aug. 8, 1950 |
| 2,564,201 | Hainke | Aug. 14, 1951 |
| 2,577,938 | Walte | Dec. 11, 1951 |
| 2,669,084 | Warren | Feb. 16, 1954 |
| 2,680,829 | Rhyne et al. | June 8, 1954 |
| 2,718,739 | Long | Sept. 27, 1955 |
| 2,719,396 | Morris et al. | Oct. 4, 1955 |

(Other references on following page)

UNITED STATES PATENTS

| | | |
|---|---|---|
| 2,721,438 | O'Maley | Oct. 25, 1955 |
| 2,730,374 | Rogers et al. | Jan. 10, 1956 |
| 2,734,327 | Whitney | Feb. 14, 1956 |
| 2,740,246 | Smith et al. | Apr. 3, 1956 |
| 2,748,362 | Andis | May 29, 1956 |
| 2,760,327 | Bovee | Aug. 28, 1956 |
| 2,774,020 | Griffes et al. | Dec. 11, 1956 |
| 2,775,087 | Abel et al. | Dec. 25, 1956 |
| 2,836,024 | Davis et al. | May 27, 1958 |
| 2,864,223 | Lundell | Dec. 16, 1958 |
| 2,880,561 | Lundell | Apr. 7, 1959 |